June 10, 1930. W. C. SPECK 1,763,271
CULTIVATOR ATTACHMENT
Filed Oct. 10, 1927
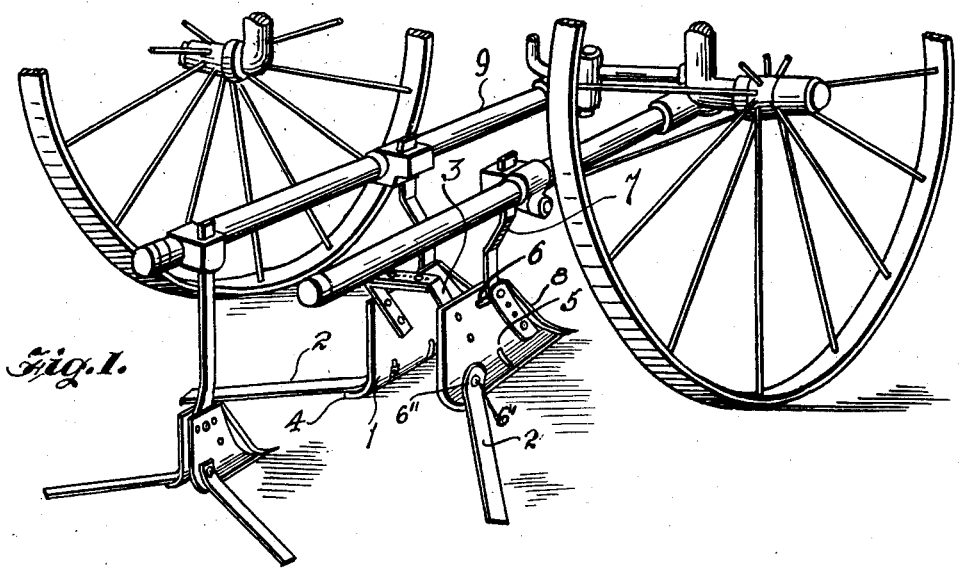
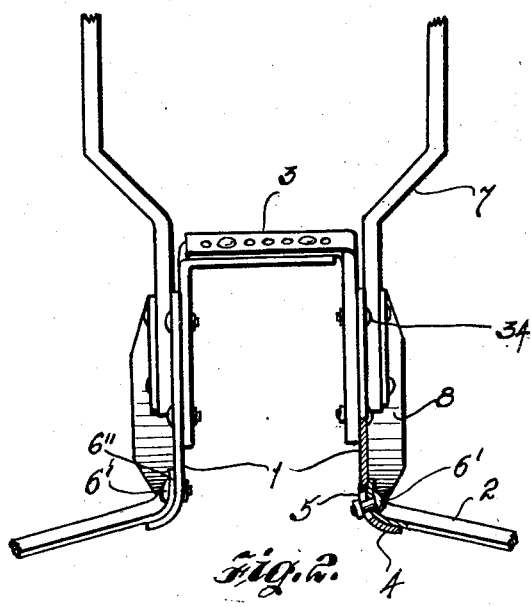
William C. Speck,
INVENTOR
BY John M. Spellman
ATTORNEY Patented June 10, 1930

1,763,271

UNITED STATES PATENT OFFICE

WILLIAM C. SPECK, OF LAMESA, TEXAS

CULTIVATOR ATTACHMENT

Application filed October 10, 1927. Serial No. 225,072.

This invention relates to improvements in agricultural implements and in such connection it relates more particularly to an attachment for cultivators.

The principal object of the invention is to provide an attachment for cultivators which shall be universal in its application to all makes and types of implements of this class.

A further object of the invention is to provide an attachment of this character for the cultivation of row crops and designed to fulfill all the requirements of adjustment of the cutting blades to all angles along the hills formed by the rows, and in spacing between the rows.

With the above objects in view, the invention will be fully understood from a perusal of the following detailed description, taken in connection with the accompanying drawings forming part hereof and in which:

Figure 1 is a partial perspective view of a cultivator and illustrating an embodiment of the invention, and Figure 2 is an enlarged rear view of the attachment by itself.

Proceeding in accordance with the drawings and wherein different numerals denote the various parts of the invention, 1 denotes the runners, 2 the blades and 3 the adjusting bars. The runners are, as shown in Figure 1 more prominently, curved outwardly at 4 and provided with slots 5 to receive a bolt 6' for adjustably attaching the blades to the runners at the rounded ends 6" thereof and at different positions. There are also arranged slots 6 for the purpose of securing adjustment of the feet or depending elements 7 on the runners 1. On the forward edge of each runner are arranged spreader elements 8. The runners are firmly attached to the cultivator beams 9 by the depending members or feet 7. The arrangement is such that the runners and blades will cut the weeds between the rows and close up to the plants and the runners may be adjusted to suit requirements in this respect.

From the foregoing it will be apparent that the attachment is susceptible of meeting the various adjustments necessary to reach and cultivate the soil around row plants and to clear the soil of undesirable growing vegetation in an expeditious manner. The invention embodied in the attachment may be easily connected to any standard cultivator and other types of these implements and is conveniently and quickly adjustable.

What is claimed is:

An attachment for cultivators comprising runner members connected together in spaced relation, each member having connection with a depending element of the cultivator beams; said runner members having their lower edges or soil-engaging surfaces curved outwardly; a spreader blade carried on each of said runner members at the forward edges of said members, said spreader blades having their cutting or soil-treating and engaging surfaces directed outwardly and away from the space between said runner members to permit passage of soil and weeds; slots in said outwardly-curved surfaces of the runner members; cutter blades having their inner ends curved to seat in the curved surfaces of said runner members and bolts for adjustably connecting the blades to the curved surfaces of the runners.

In testimony whereof I affix my signature.

WILLIAM C. SPECK.